US00RE37499B1

(19) United States
(12) Reissued Patent
Kazuma

(10) Patent Number: US RE37,499 E
(45) Date of Reissued Patent: *Jan. 8, 2002

(54) APPARATUS FOR MANUFACTURING CARBONATED WATER

(75) Inventor: Yasuo Kazuma, Saitama-ken (JP)

(73) Assignee: Sanyo Electric Co., LTD, Osaka (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/556,211

(22) Filed: Nov. 9, 1995

Related U.S. Patent Documents

Reissue of:
(64) Patent No.: 5,259,997
Issued: Nov. 9, 1993
Appl. No.: 08/026,124
Filed: Mar. 3, 1993

U.S. Applications:

(62) Division of application No. 07/774,832, filed on Oct. 11, 1991, now abandoned.

(30) Foreign Application Priority Data

Oct. 16, 1990 (JP) ..... 2-278391

(51) Int. Cl.[7] ..... B01F 3/04
(52) U.S. Cl. ..... 261/119.1; 261/DIG. 7
(58) Field of Search ..... 261/111, 119.1, 261/DIG. 7

(56) References Cited

U.S. PATENT DOCUMENTS

| | | | | | |
|---|---|---|---|---|---|
| 626,126 | A | * | 5/1899 | Zingsem | 261/DIG. 7 |
| 1,043,127 | A | * | 11/1912 | Mueller | 261/111 |
| 1,655,816 | A | * | 1/1928 | Josephson | 261/DIG. 7 |
| 1,986,736 | A | * | 1/1935 | Manthe et al. | 261/111 |
| 2,217,841 | A | * | 10/1940 | Holinger | 261/DIG. 7 |
| 2,271,896 | A | * | 2/1942 | Lewis | 261/DIG. 7 |
| 2,339,640 | A | * | 1/1944 | Holinger | 261/DIG. 7 |
| 2,391,003 | A | * | 12/1945 | Bowman | 261/DIG. 7 |
| 2,650,808 | A | * | 9/1953 | Cohen et al. | 261/DIG. 7 |
| 3,067,953 | A | * | 12/1962 | Agnides | 261/119.1 |
| 3,172,736 | A | * | 3/1965 | Gee et al. | 261/36.1 |
| 3,248,098 | A | * | 4/1966 | Cornelius | 261/DIG. 7 |
| 3,686,833 | A | * | 8/1972 | Rush | 261/119.1 |
| 4,249,920 | A | * | 2/1981 | Vesel | 261/DIG. 7 |
| 4,432,914 | A | * | 2/1984 | Schifftner | 261/111 |
| 4,489,565 | A | * | 12/1984 | Taylor | 261/119.1 |
| 4,632,275 | A | * | 12/1986 | Parks | 261/DIG. 7 |

FOREIGN PATENT DOCUMENTS

| | | | | |
|---|---|---|---|---|
| FR | 2428613 | * | 2/1980 | 261/DIG. 7 |
| GB | 2157963 | * | 11/1985 | 261/DIG. 7 |
| JP | 61-164630 | * | 7/1986 | |

* cited by examiner

*Primary Examiner*—Richard L. Chiesa
(74) *Attorney, Agent, or Firm*—Darby & Darby

(57) ABSTRACT

An apparatus [is] *and method are* provided for manufacturing carbonated water rapidly with a high rate of inclusion of carbonic acid gas in the carbonated water and having a reduced dispersion, the manufacture taking place in a water storage container in which a perforated bowl is connected to an upper surface thereof with water being sprayed into the bowl from a water supply line. The water sprayed into the bowl has droplets from about 0.01 to 0.5 mm in diameter and from about 3 to 30% of the water sprayed into the bowl flows outwardly through ports in the bottom wall of the perforated bowl. From about 70 to 97% by weight of the water supplied to the bowl flows outward through ports in the side walls of the bowl.

2 Claims, 3 Drawing Sheets

APPARATUS FOR MANUFACTURING CARBONATED WATER

Matter enclosed in heavy brackets [ ] appears in the original patent but forms no part of this reissue specification; matter printed in italics indicates the additions made by reissue.

This application is a division of application Ser. No. 07/774,832, filed Oct. 11, 1991, now abandoned.

BACKGROUND OF THE INVENTION

1. Field of the Invention

This invention relates to a apparatus for manufacturing carbonated water by contact between carbonic acid gas and water, and more particularly apparatus for manufacturing carbonated water suitable for a carbonated beverage supplying apparatus such as an automatic vending machine or a dispenser or the like.

2. Description of the Prior Art

In the prior art of the method for manufacturing carbonated water, the method for producing carbonated water by arranging an orifice at an upper part of a carbonic acid gas pressure container, injecting water from this orifice into the container and absorbing carbonic acid gas into air bubbles generated during the injection is well known in Japan Patent Laid-Open No.Sho 61-164630, for example.

However, this prior art method is carried out by absorbing carbonic acid gas in water under vibration of water injected from the orifice, so that the prior method has a drawback that carbonic acid gas may easily be separated due to a human body temperature upon charging carbonated water produced by the prior art method, and so a so-called pungent overthroating delicious carbonated water can not be generated.

In view of the foregoing, it also proposed to inject water through sprays arranged at an inside part of a side wall of the carbonic acid gas pressure container to get a sufficient dispersing distance for water to absorb carbonic acid gas. However, in case of the carbonated beverage manufacturing apparatus arranged in a limited space such as an automatic vending machine or a dispenser, it is not practical to make a large-sized carbonated beverage manufacturing apparatus to elongate the dispersing distance. In view of the above, it is already proposed to provide a method to get a water dispersing distance without making any large-sized device in which a convex surface is arranged in opposition to the sprays and the injected water is hit against the convex surface. However, even with such an arrangement as above, since almost all of the energies of water struck against the convex surface are absorbed in the convex surface, the water does not rebound from the convex surface, but drops along the convex surface and thus an expected effect may not be attained.

In addition, although there is another method for generating quite fine atomized fog by injecting water linearly from a nozzle into the carbonic acid gas pressure container and striking the water against the inner wall of the container, almost all of the energies of striking water are absorbed in the inner wall surface, the result being that the water is dropped along the wall surface, consequently this method is ineffective.

In addition, there is also another method in which cooled water is put in the carbonic acid gas pressure container, agitated by a stirrer arranged in the container and air bubbles generated at this time may gradually absorb carbonic acid gas. However, in the case that such a carbonated water manufacturing apparatus is used in the automatic vending machine or dispenser, a continuous and prolonged production of carbonated water causes a rapid reduction of the carbonic acid gas in the carbonated water in the carbonic acid gas pressure container, resulting in carbonated water that is unsuitable for dispensing.

SUMMARY OF THE INVENTION

The present invention is provided in order to resolve the aforesaid problem. It is an object of the present invention to provide an apparatus for manufacturing carbonated water rapidly and for producing carbonated water having a high rate of inclusion of carbonic acid gas and less dispersion of carbonic acid gas.

In the apparatus for manufacturing carbonated water in accordance with the present invention, water fed into the carbonic acid gas pressure container is mainly in a droplet form with its diameter being larger than 0.01 mm and smaller than 0.5 mm and is sprayed against water accumulated in the carbonic acid gas pressure container at a speed more than at least 5 cm/sec.

DETAILED DESCRIPTION OF THE PREFERRED EMBODIMENT

In the present invention, a large amount of air bubbles with their diameter being less than 1 mm are generated by feeding water into a carbonic acid gas container at a speed of at least more than 5 cm/sec in the form of water droplets mainly with a diameter larger than 0.01 mm, and smaller than 0.5 mm and striking the water against water accumulated in the carbonic acid gas pressure container. Carbonic acid gas is absorbed in the bubbles to enable carbonated water having a high rate of inclusion of carbonic acid gas and less amount of dispersion to be produced.

Figure 1:
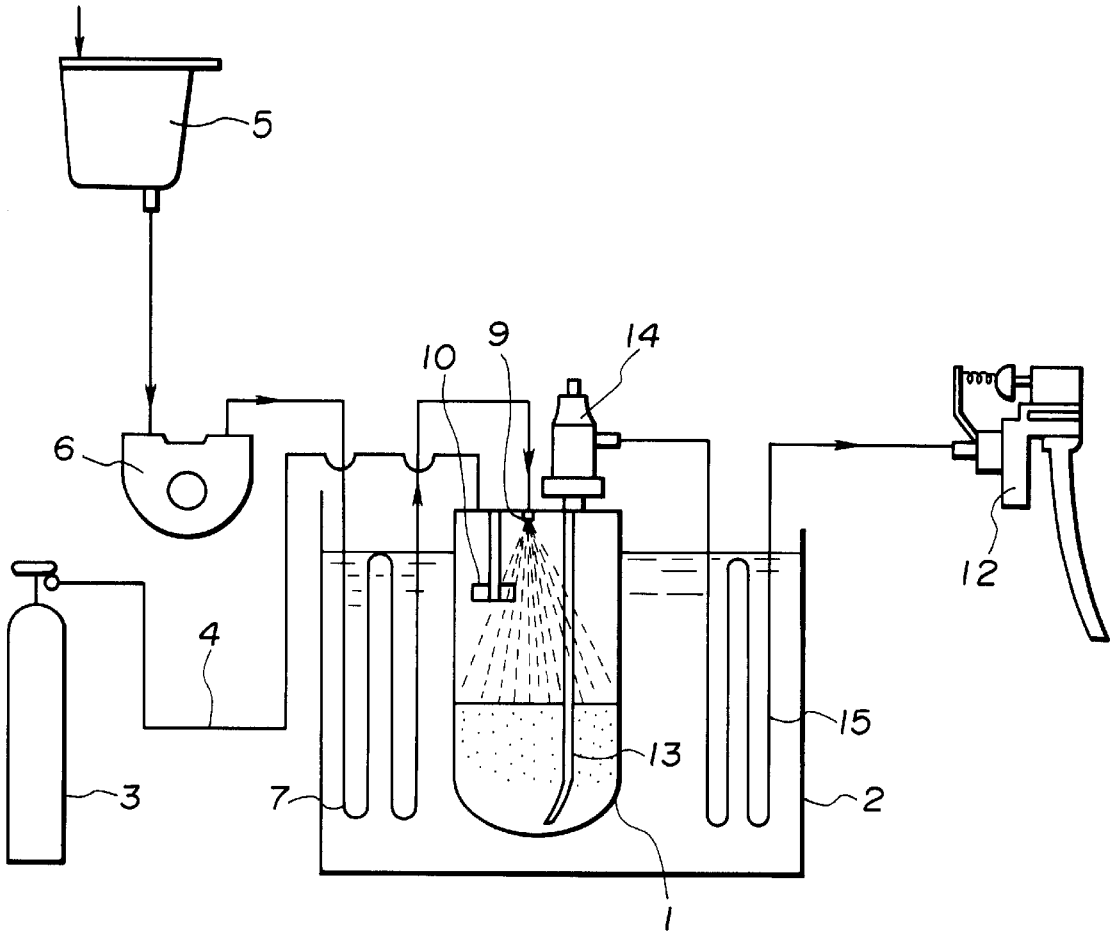
FIG. 1 is a cross-sectional view of a carbonated water manufacturing and supplying apparatus for performing the present invention.
Figure 2:
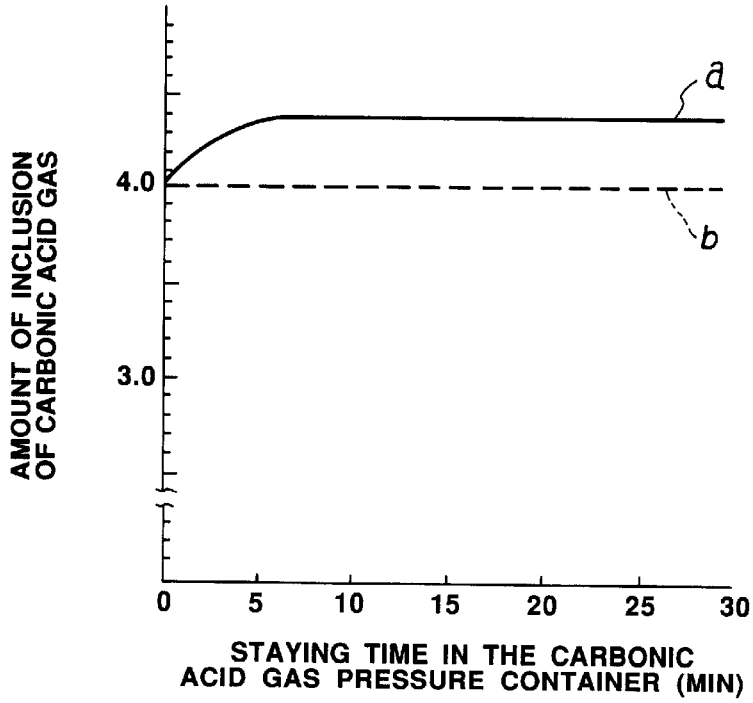
FIG. 2 is a graph showing the a variation of an amount of inclusion of carbonic acid gas in carbonated water in respect to the staying time in the container when the carbonated water produced in accordance with the manufacturing method of the present invention, and the carbonated water produced by the prior art manufacturing method are left in the carbonic acid gas pressure container.
Figure 3:
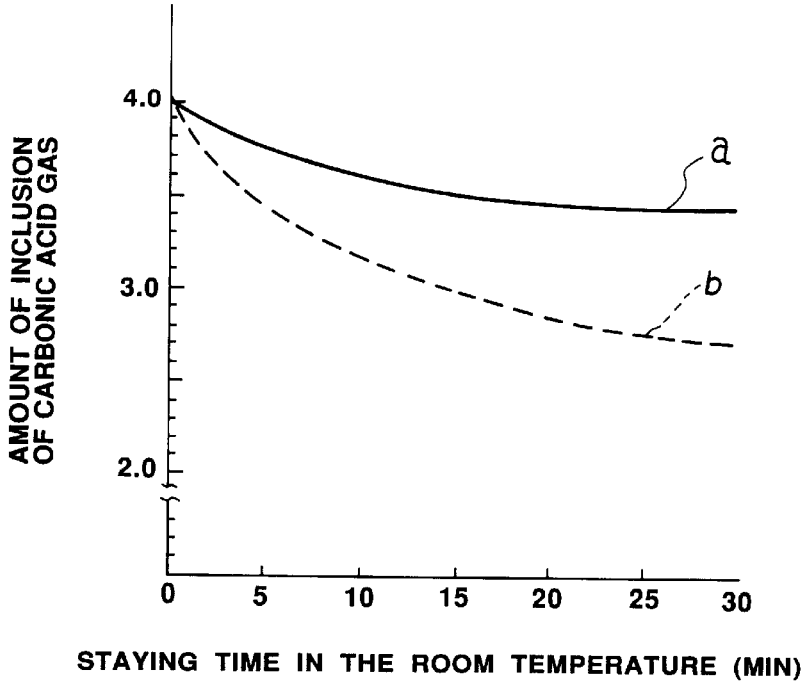
FIG. 3 is a graph showing a variation in the amount of inclusion of carbonic acid gas on carbonated water in respect to the staying time when the carbonated water produced by the manufacturing method of the present invention and the carbonated water produced by the prior art manufacturing method are left at room temperature.

Referring now to FIGS. 1 to 3, the preferred embodiment of the present invention will be described.

A carbonic acid gas container 1 is immersed in a cooling water tank 2 and its temperature is kept cold. To this carbonic acid gas pressure container 1 is supplied carbonic acid gas under pressure from a carbonic acid gas cylinder 3 through a carbonic acid gas feeding pipe passage 4, and further to the carbonic acid gas pressure container 1 is supplied water under pressure from a cistern having tap water stored therein through a water supplying pump 6. Within the carbonic acid gas pressure container 1 is arranged a water level control sensor 10. As an amount of carbonated water in the container 1 is reduced, the water level control sensor 10 is operated to cause a pump 6 to be operated. As the pump 6 is operated, water from the cistern 5 is by a cooling coil 7 immersed in the cooling water tank 2, thereafter the water is fed into the carbonic acid gas pressure container 1.

Then, the water fed into the carbonic acid gas pressure container 1 is atomized or injected from a spray 9 into the container 1 at a pressure higher by 3 kg/cm$^2$ than that within the container 1. With such an arrangement, the water fed into the carbonic acid gas pressure container 1 strikes against water in the carbonic acid gas pressure container 1 with the diameter of the water droplets being larger than 0.01 mm and smaller than 0.5 mm and at a speed of at least more than 5 cm/sec. As the water is atomized or injected into the carbonic acid gas pressure container 1 under such a condition as above, at first the atomized water droplets may absorb carbonic acid gas, carbonated water accumulated in the container 1 may accept carbonic acid gas under a striking force of the water droplets so as to generate a large amount of small air bubbles. The air bubbles are mixed and agitated quite slowly under the striking force of the water droplets, thereby carbonated water of good quality is generated in the container 1.

The carbonated water produced in this way shows that its gas is difficult to be separated and almost all of the gas may not be separated immediately by a human body temperature even if the water is held in the mouth. Accordingly, gas separation continues even when the carbonated water passes through the throat, and the carbonated water exhibits a pungent taste through the throat.

When, the carbonated water supplying valve 12 is opened at a vending site, the carbonated water produced in the carbonic acid gas pressure container 1 as described above is discharged out of the carbonic acid gas pressure container 1 through a siphon tube 13, passes through a flow rate control device 14, and then the carbonated water is cooled again by the cooling coil 15. Thereafter the carbonated water is supplied from the carbonated water supplying valve 12.

As described above, the present invention is characterized in that water fed into the carbonic acid gas pressure container 1 is struck against water retained in the carbonic acid gas pressure container 1 at a speed of more than 5 cm/sec in the form of water droplets mainly having a diameter larger than 0.01 mm and lower than 0.5 mm.

The finer the diameter of the water droplets, the easier the absorption of the carbonic acid gas in the carbonated water. However, the water droplets having a diameter of 0.01 mm or less may not attain a speed of the water droplets of more than 5 cm/sec. In this case, even if the water droplets are struck against a surface of the water retained in the container 1, a range of only about 5 mm from the water surface shows an occurrence of air bubbles, resulting in that an absorbing action of gas caused by the air bubbles is reduced and then an absorbing efficiency of gas is deteriorated.

Although a diameter of droplets more than 0.5 mm may assure a speed of the water droplets more than 5 cm/sec, a striking contact of the water droplets with water in the carbonic acid gas pressure container 1 may generate a large amount of air bubbles having a diameter more than 1 mm. Such large air bubbles are superior in view of the effect of agitation of the carbonated water. However, even if a small amount of carbonic acid gas is contained in the small air bubbles, a larger amount of such small air bubbles may cause the water in the carbonic acid gas pressure container 1 to absorb gas more easily than the case in which the large air bubbles contain a large amount of carbonic acid gas, resulting in that a more dense carbonated water can be attained. Because as the bubbles are increased more than 2 mm, in particular, the bubbles are crushed immediately and carbonic acid gas contained in the air bubbles is released and an amount of absorbed gas in the water is reduced.

FIG. 2 indicates a variation of an amount of inclusion of carbonic acid gas contained in the carbonated water in respect to a staying time when each of the carbonated water (a) produced by the manufacturing method of the present invention and the carbonated water (b) produced by generating some relatively large air bubbles as found in the prior art is left in the carbonic acid gas pressure container 1. As apparent from this figure, since the gas in the air bubbles in the carbonated water (b) is released at once due to the large size of the air bubbles, and absorption of gas during the residence time is carried out mainly at an interface between the water surface and carbonic acid gas, then a small amount of carbonic acid gas contained in the carbonated water is increased within a short period of time. To the contrary, the carbonated water (a) is not widely agitated and carbonic acid gas contained in the fine bubbles is absorbed by water when the air bubbles are floating in the water surface or when the air bubbles ascend toward the water surface, resulting in that the amount of carbonic acid gas contained in the carbonated water is increased within a short period of time.

FIG. 3 indicates that the amount of carbonic acid gas contained in the carbonated water is decreased as time elapses when the carbonated water (a) and the carbonated water (b) are left in the room with a temperature of +25° C. Also in this case, since the carbonated water (a) is more dense carbonated water having less separation of gas, reduction in the amount of carbonic acid gas contained in the carbonated water is quite low.

Figure 4:
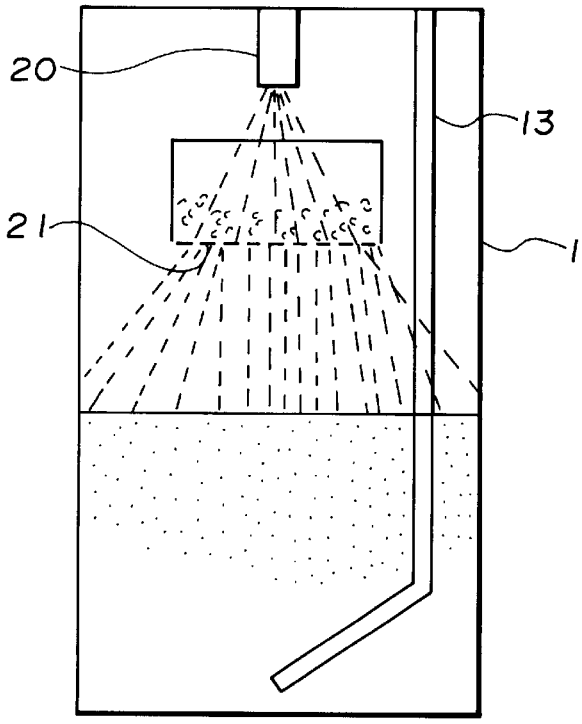
FIG. 4 is a cross-sectional view showing an apparatus when some water droplets are struck against water accumulated in the carbonic acid gas pressure container.

As a method for striking water droplets against the water stayed in the carbonic acid gas pressure container 1, there are various examples of modification other than the aforesaid preferred embodiment. In a system shown in FIG. 4, water is injected or atomized from an upper part of the carbonic acid gas pressure container 1 through a nozzle 20 at a pressure higher than that in the container 1 by 2 kg/cm or more and the water is passed through a net 21 with 100 to 350 meshes arranged below the nozzle 20, resulting in that the water droplets mainly with a diameter larger than 0.01 mm and lower than 0.5 mm are struck at a speed of more than at least 5 cm/sec against water stayed in the container.

In addition, it has already been described in the foregoing paragraph that occurrence of air bubbles with a diameter larger than 1 mm while the water droplets are struck against water accumulated in the carbonic acid gas pressure container 1, improves the agitating effect. In view of this fact, water droplets having a larger diameter than that of other water droplets having a diameter larger than 0.01 mm and smaller than 0.5 mm are mixed with the latter and atomized, resulting in a more effective operation. In this case, a rate of large water droplets is preferably less than 40%. Thus, since the air bubbles having a diameter of 1 mm or less generated by striking water droplets having a diameter larger than 0.01 mm and smaller than 0.5 mm are properly agitated within the carbonic acid gas pressure container 1, it is possible to generate carbonated water having a unified concentration of carbonic acid gas.

Figure 5:
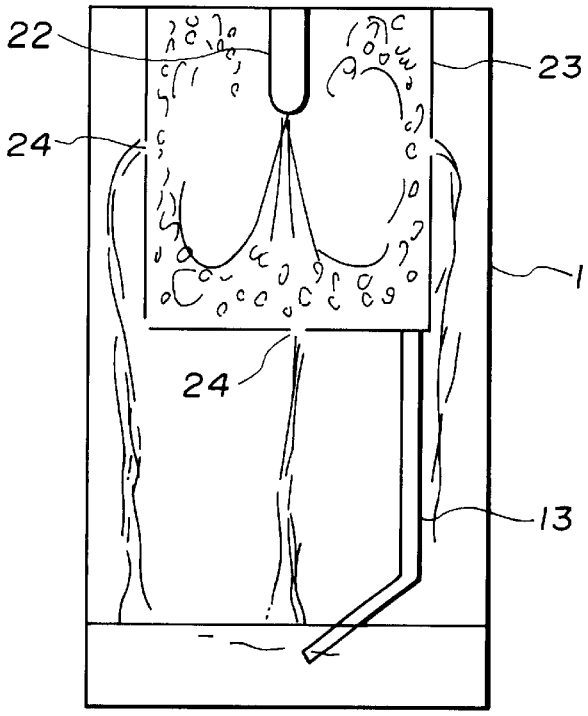
FIG. 5 is a cross-sectional view showing an example of a still further configuration when some water droplets are struck against water accumulated in a carbonic acid gas pressure container.

As described above, in the case that the water droplets having a diameter of 0.5 mm or more are mixed with water droplets having a diameter larger than 0.01 mm and smaller than 0.5 mm, as shown in FIG. 5, it is preferable to arrange a bowl 23 having outlet ports 24 at its side surface and bottom surface below the spray 22 for use in injecting or atomizing the aforesaid two types of water droplets. At this time, an opening area of each of the outlet ports 24 is set in such a way as an amount of carbonated water flowing out of the outlet port 24 at the bottom surface is in a range of 3% to 30% of a flowing-in amount for the bowl 23 and an amount of carbonated water flowing out of the outlet port 24 is in a range of 70% to 97% of a flowing-in amount for the bowl 23. Arrangement of such a bowel 23 as above causes water to be agitated in the bowl 23, resulting in that a stable carbonated water can be accumulated near the suction port of the siphon tube 13 within the carbonic acid gas pressure container 1.

In order to get an agitating effect of the water, it is also possible to arrange a stirrer rotated at the number of revolution of 120 rpm or less within the carbonic acid gas pressure container 1 or circulate carbonic acid within the carbonic acid gas pressure container 1 at a volume of a circulating amount of 1 litter/min or less and thus it is further possible to make an effective agitation of water without dispersing carbonic acid gas contained in the water.

According to the present invention, as described above, the carbonic acid gas absorbing action of the water is increased by generating fine bubbles in the carbonic acid gas pressure container, resulting in that the carbonated water with less amount of separation of carbonic acid gas can be generated.

What is claimed is:

1. In an apparatus for the manufacture of carbonated water comprising (1) A carbonated water storage container having a bottom wall, (2) a perforated bowl connected to an upper portion of said storage container, said perforated bowl having side walls and a bottom wall and outlet ports in the side and bottom walls, (3) a water supply line connected to said storage container at an upper portion thereof and arranged to spray water into an inner portion of said perforated bowl, with water droplets from the spray being from about 0.01 to 0.5 mm in diameter, *the sprayed water generating bubbles in water contained in the bowl and on the surface of the contained water;*

(4) means to supply carbonic acid gas to the storage container, (5) a siphon tube having an open end near the bottom wall of said water storage container to carry collected carbonated water from the storage container, and (6) said outlet ports in the bottom wall of said perforated bowl permitting outflow therefrom of from about 3 to 30% of water supplied to said perforated bowl from said water supply line, and said outlet ports in the sidewalls of said perforated bowl permitting outflow therefrom of from about 70 to 97% of water supplied to said perforated bowl from said water supply line, *thereby maintaining a level of the water contained in the bowl as high as the height of the outlet ports in the sidewalls, a portion of the sidewalls, above the outlet ports in the sidewalls in height, functioning as holding means for holding the generated bubbles floating on the water within the bowl to achieve an effective absorption of carbonic acid gas into water*.

2. The apparatus of claim 1, wherein the outlet ports in said perforated bowl are below the water supply line from which water is sprayed into the bowl.

* * * * *